United States Patent Office 3,099,423
Patented July 30, 1963

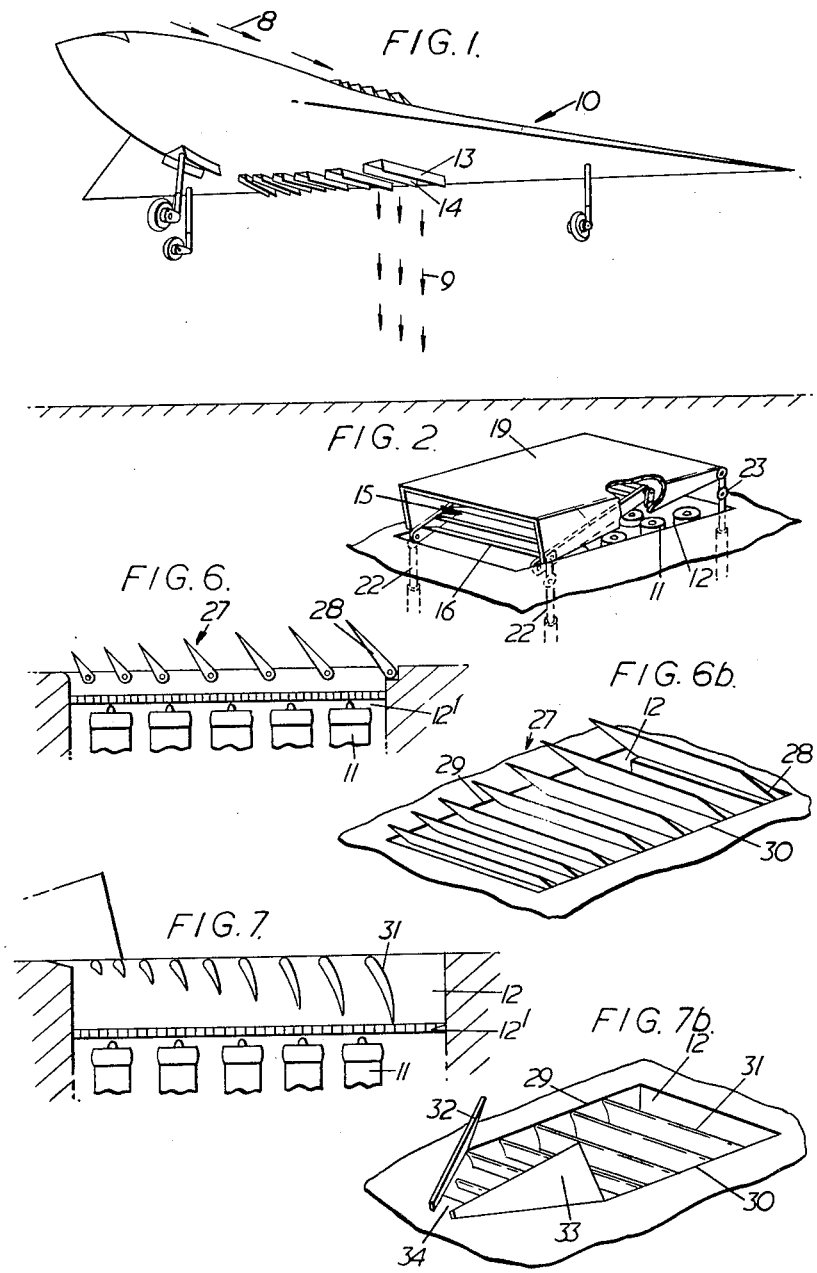

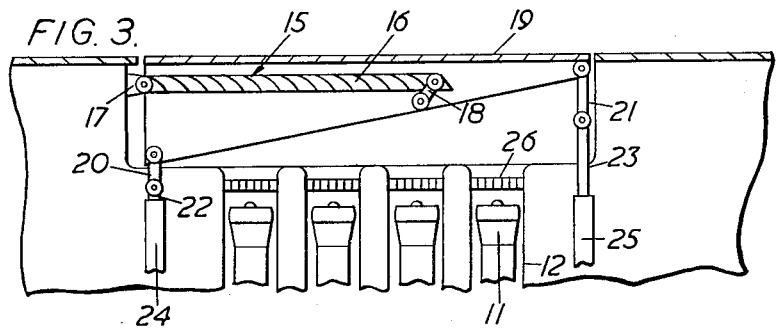
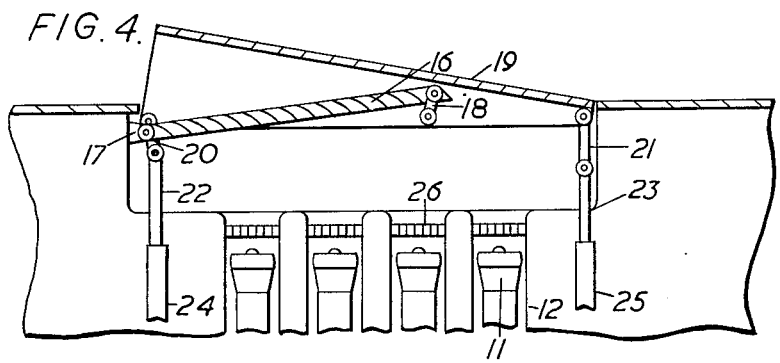
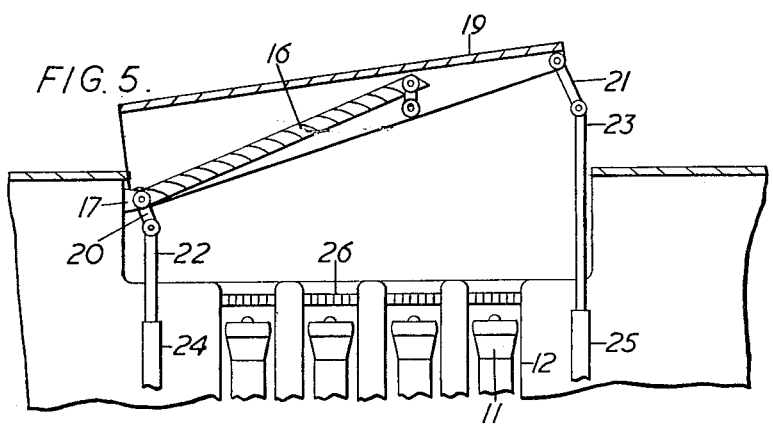

3,099,423
VTOL AIRCRAFT ENGINE INLET STRUCTURE
Geoffrey Light Wilde, Shottlegate, and Frederick Reginald Murray, Newstead Abbey, Linby, England, assignors to Rolls-Royce Limited, Derby, England, a company of Great Britain
Filed Oct. 2, 1961, Ser. No. 142,157
9 Claims. (Cl. 244—23)

This invention concerns aircraft adapted for vertical take-off and landing.

Such aircraft may be provided, in addition to forward propulsion engines, with vertical lift engines which are employed during take-off and landing of the aircraft. The term "vertical lift engines," as used in this specification, is to be understood to mean engines arranged to produce lift forces on the aircraft independently of lift forces generated aerodynamically by forward flight.

In order to start the vertical lift engines when it is required to land the aircraft, it is necessary to direct an adequate supply of air into the air intakes of the vertical lift engines. It is therefore the object of the present invention to provide an arrangement which shall be satisfactory in this respect.

According to the present invention there is provided an aircraft adapted for vertical take-off and landing and having a housing within which is mounted at least one vertical lift engine, the housing being provided with a vertically movable air inlet member adapted for the passage therethrough of air drawn into the engine air intake or intakes, and means for moving the said air inlet member vertically upwardly so as to increase the distance between the said air inlet member and the engine air intake or intakes when the said engine or engines is or are to be brought into operation.

Preferably the vertically movable air inlet member is provided with a plurality of guide vanes for guiding air into the engine air intake or intakes.

Closure means are preferably provided for preventing admission of air into the housing, the closure means being movable into an open position in which air may be admitted into the housing.

The said closure means and the said vertically movable air inlet member may be constituted by different members.

Means may be provided for selectively covering and uncovering an outlet from the housing, said outlet being adapted for the passage therethrough of exhaust gases from the said engine or engines.

The said vertically movable air inlet member may comprise a frame provided with the said guide vanes, said frame being movable vertically through an opening at the top of the housing from a position within the housing to a position in which it projects beyond the housing when air is to be admitted into the housing, the housing being provided with closure means for covering the said opening when the said vertically movable air inlet member is disposed within the housing.

The vertically movable air inlet member may comprise a grid-like frame of fixedly interconnected vanes, the said frame being disposed within an inverted channel-shaped member which is movable between an open position, in which it serves as an air scoop for directing ambient air through said frame, and a closed position, in which it serves as a closure for the top of the housing.

The channel-shaped member is preferably movable to a position in which ambient air can enter said housing at the front and rear ends of said channel-shaped member.

The invention is illustrated, merely by way of example, in the accompanying drawings in which:

FIGURE 1 is a schematic perspective view of an aircraft according to the invention, the aircraft being shown as about to land, FIGURE 2 is a perspective view of a part of the structure of the aircraft of FIGURE 1, FIGURES 3–5 are sections showing the structure of FIGURE 2 in various positions, FIGURES 6 and 6b are respectively a schematic section and a perspective view of alternative guide vanes which may be provided on the aircraft of FIG. 1, and FIGURES 7 and 7b are respectively a schematic section and perspective view of yet other alternative guide vanes.

Referring first to FIGURES 1–5, a delta wing aircraft 10, adapted for vertical take-off and landing is provided with forward propulsion, gas-turbine, jet-reaction engines (not shown) and with vertical lift, gas-turbine jet-reaction engines 11 (see FIGURE 2) which are arranged to produce lift forces on the aircraft independently of lift forces generated aerodynamically by forward flight.

The vertical lift engines 11 are arranged in longitudinal rows in engine housings 12, the engines in each row being longitudinally spaced from one another. The lower ends of the housings 12 are provided with outlets for the passage therethrough of exhaust gases from the engines 11, the outlets being closable by doors 13, 14. Means, such for example as double acting air-operated jacks, not shown, are provided for opening and closing the doors 13, 14. The doors are shown in FIGURE 1 in their open positions, when however the doors are in their closed positions, they present surfaces in continuity with the general aerodynamic profile of the aircraft.

For each housing 12 there is provided a grid-like frame 15 having a cascade of arcuate vanes 16, the grid-like frame 15 constituting an air inlet member. Each grid-like frame 15 is pivotally mounted at one end on a fixed strut 17 (FIGURE 3) and is pivoted at the other end to a link 18. The link 18 is pivotally mounted within an inverted, channel-shaped, air scoop member 19 whose top wall serves as a closure for an opening at the upper end of the housing 12. The forward and after ends of the scoop member 19 are respectively connected by links 20, 21 to the rods 22, 23 of air-operated jacks 24, 25 respectively so that the scoop member 19 may be moved vertically by means of said jacks between open and closed positions. When the scoop member 19 and grid-like frame 15 are open and the aircraft is in forward flight, ambient air is trapped within the scoop member 19 and is downwardly directed into the air intakes of the lift engines by the vanes 16 and also by honey comb air straighteners 26.

It will be appreciated that the vertical movement of the scoop member 19 into the open position causes the distance between the grid-like frame 15 and the engine air intakes to be increased. Accordingly any swirl which remains in the air passing to the engine air intakes, after it has passed through the guide vanes 16, will tend to be obviated or reduced by the increased distance through which it must travel.

Each scoop member 19 and associated grid-like frame 15 is movable between the three positions shown respectively in FIGURES 3–5. In the FIGURE 3 position, which is the position of the parts when the engines 11 are out of operation, the scoop member 19 is fully closed so that its upper surface lies in the general aerodynamic profile of the aircraft and so that air is prevented from entering the bay 12.

When, however, it is required to land the aircraft the doors 13, 14 are moved to their open positions and the scoop members 19 and grid-like frames 15 are first raised by the rods 22 to the position shown in FIGURE 4, in which the grid-like frames 15 have been moved vertically through the openings at the tops of the housings to a position in which they project beyond the housings. The aircraft will, at this stage, still be in forward flight.

Accordingly the ambient air flowing over the upper surface of the aircraft, as indicated by the arrows 8 in FIGURE 1 will be deflected by the vanes 16 into the air intakes of the engines 11. There will, therefore, be a sufficient supply of air to permit lighting of the engines 11. As the aircraft forward speed is reduced, the rods 23 are gradually raised until, when the aircraft forward speed is reduced to zero, the parts are disposed as shown in FIGURE 5. In the FIGURE 5 position, which is the position adopted during vertical flight, hovering and take-off, the raising of the rear end of the scoop member ensures that the maximum air intake is provided for the engines 11. Once the engines 11 are lit, air will of course be sucked thereby into the engines intakes so that it will not be necessary to maintain forward flight in order to keep the engines alight.

The exhaust gases from the engines 11 are vertically directed, as indicated by the arrows 9 in FIGURE 1, so as to provide the required lift thrust.

In FIGURES 6 and 6b, there is shown an alternative form of air deflector arrangement for an aircraft such as is shown in FIG. 1, constituted by a grid 27 which also acts as the closure member of its housing 12. The grid 27 comprises vanes 28 which have a substantially triangular shape in section and which are pivotally mounted in the longitudinal walls 29, 30 of the housing 12. Air operated jacks (not shown) may be used for moving the vanes 28 (or if desired, selected vanes 28) between their open and closed positions. As will be clearly seen from FIGURE 6, each of the vanes 28 projects vertically above, so as to be disposed partially out of the lee of, the vanes 28 which are forward of it. Accordingly, when the grid 27 is open and the aircraft is in forward flight, air will be directed into each of the intakes of the engines 11 via a honey comb air straightener 12'.

Yet another arrangement of vanes for an aircraft such as is shown in FIG. 1 is shown in FIGURES 7 and 7b, in which the arrangement comprises a grid whose vanes 31 are substantially of aerofoil section and are so disposed that both in the open and in the closed position they lie wholly within the housing 12. The vanes 31, which are pivotally mounted in the longitudinal walls 29, 30 of the housing 12, may be moved (by means not shown) between the open position shown and a closed position in which they act as a top closure member of the housing 12. The means for moving the vanes 31 is such as to permit some of the vanes 31 to be moved independently of the remainder. Each vane 31 is of greater length than the vane or vanes 31 forward of it.

If desired, at least the six rear vanes 31 may be spring urged (by means not shown) towards the closed position, these vanes being adapted to be opened by ram air pressure or manually, as desired.

Mounted adjacent the forward edge of the housing 12 are a pair of substantially triangular flaps 32, 33 which may be moved, by means not shown, between the open position shown and a closed position in which they lie on top of the adjacent fairing. The flaps 32, 33 are arranged at an angle to each other so that there is only a small gap 34 between their forward ends whereas there is a large gap between their after ends.

Accordingly, when the flaps 32, 33 are raised and the aircraft is in forward flight, the flaps 32, 33 will act as deflectors of a known kind which produce a forced vortical movement in the air flowing therethrough. The air, which has had such vortical movement imparted to it, is deflected by the vanes 31 and via a honey comb air straightener 12' into the engine intakes, and the vortical movement of the air will assist the entry of high pressure air into the engines 11.

In operation, when it is desired to light the engines 11, the flaps 32, 33 are raised and certain of the forward vanes 31 are opened. This allows a contricted passage of air into the engine intakes, giving a ram effect and promoting easier starting. The remainder of the vanes 31 are then opened by ram power or manually against the spring closure means to provide an open passage for the air to the engines in the housing 12.

To be entirely satisfactory, the air intake of a vertical lift engine should be such that air will be supplied to the engine, both under ground running and vertical flight conditions, with a minimum of pressure loss and with a reasonably uniform velocity distribution into the engine. The air should, additionally, be supplied under forward flight conditions with a uniform velocity distribution and with a sufficient ram pressure recovery to facilitate starting of the engine. Moreover the air flow externally of the aircraft and downstream of the intake should not upset the air flow into other lift engines or into forward propulsion engine intakes or reduce the effectiveness of any aerodynamic control surfaces. The intake, moreover, should be formed so as to be as light as possible and to have as little effect as possible on the stability of the aircraft, while there should be means for closing the intake so as to make it fairly pressure-tight when not in use, said means being disposed when closed in the general aerodynamic profile of the aircraft so as to reduce drag to a minimum. It will readily be appreciated that the arrangements shown in the drawings permit these desiderata to be achieved.

We claim:

1. In an aircraft adapted for vertical take-off and landing: a lift engine housing, at least one vertical lift engine mounted within the housing, said engine having an air intake, an air inlet for said housing in the external surface of the aircraft, a plurality of guide vanes each separately pivotally mounted in said air inlet and extending transversely of the aircraft across said air inlet and spaced stepwise from one another longitudinally of the aircraft, said guide vanes being pivotable to operative positions in which each guide vane projects away from said external surface further than the preceding guide vane, the guide vanes in said operative positions deflecting air via said air inlet into said engine intake when the aircraft is moving forwardly.

2. In an aircraft adapted for vertical take-off and landing: a lift engine housing, at least one vertical lift engine mounted within the housing, said engine having an air intake, an air inlet for said housing in the external surface of the aircraft, a plurality of guide vanes each separately pivotally mounted in said air inlet and extending transversely of the aircraft across said air inlet and spaced stepwise from one another longitudinally of the aircraft, said guide vanes being pivotable to operative positions in which each guide vane projects outwardly of said external surface of the aircraft in the immediate vicinity of said air inlet by progressively greater amounts considered in a direction rearwardly of the aircraft, so that each guide vane is at least partially out of the lee of the preceding guide vane, whereby in said operative positions, the guide vanes deflect air via said air inlet into said engine intake when the aircraft is moving forwardly.

3. An aircraft as claimed in claim 2 in which the chord dimensions of said guide vanes considered successively in a direction rearwardly of the aircraft progressively increase.

4. An aircraft as claimed in claim 2 in which said guide vanes are movable to inoperative positions in which they close said air inlet.

5. An aircraft as claimed in claim 1 in which the guide vanes when in their operative positions have their outermost edges lying substantially in the plane of the external surface of the aircraft in the immediate vicinity of said air inlet, flap means being provided forward of said air inlet for producing a forced vortex movement of ambient air into the guide vanes.

6. In an aircraft adapted for vertical takeoff and landing: a lift engine housing, at least one vertical lift engine mounted within the housing, said engine having an air intake, an air inlet for said housing in the external surface of the aircraft, a plurality of guide vanes each separately pivotally mounted in said air inlet on parallel axes lying in the same plane and progressively spaced apart in a direction rearwardly of the aircraft, said guide vanes extending transversely of the aircraft across said air inlet, said guide vanes being pivotable from positions closing said air inlet to operative positions in which each guide vane in a direction rearwardly of the aircraft projects away from the external surface of the aircraft further than the preceding guide vane, the guide vanes in said operative positions deflecting air via said air inlet into said engine intake when the aircraft is moved forwardly.

7. In an aircraft adapted for vertical takeoff and landing, a lift engine housing, at least one vertical lift engine mounted within said housing, said engine having an air intake, an air inlet for said housing in the external surface of the aircraft, a plurality of guide vanes each separately pivotally mounted in said air inlet on parallel axes lying in the same plane and progressively spaced apart in a direction rearwardly of the aircraft, said guide vanes extending transversely of the aircraft across said air inlet and having chord dimensions considered successively in a direction rearwardly of the aircraft which progressively increase, said guide vanes being pivotable from positions closing said air inlet to operative positions in which each guide vane in a direction rearwardly of the aircraft projects away from the external surface of the aircraft further than the preceding guide vane, the guide vanes in said operative positions deflecting air via said air inlet into said engine intake when the aircraft is moving forwardly.

8. An aircraft as claimed in claim 7 in which each of said guide vanes when in their operative positions project outwardly of said external surface of the aircraft in the immediate vicinity of said air inlet.

9. An aircraft as claimed in claim 7 in which each of said guide vanes when in their operative positions project inwardly of the external surface of the aircraft in the immediate vicinity of said air inlet, and including flap means positioned forward of said air inlet for producing a forced vortex movement of ambient air into the guide vanes.

References Cited in the file of this patent

UNITED STATES PATENTS

| | | |
|---|---|---|
| 2,936,969 | Griffith | May 17, 1960 |
| 2,997,257 | Kerry | Aug. 22, 1961 |

FOREIGN PATENTS

| | | |
|---|---|---|
| 217,315 | Australia | June 5, 1958 |